(12) United States Patent
Hiura et al.

(10) Patent No.: US 10,414,889 B2
(45) Date of Patent: Sep. 17, 2019

(54) WATER-SOLUBLE FILM AND CHEMICAL AGENT PACKAGE

(71) Applicant: THE NIPPON SYNTHETIC CHEMICAL INDUSTRY CO., LTD., Osaka (JP)

(72) Inventors: Takahiro Hiura, Osaka (JP); Kazushi Oda, Osaka (JP); Katsuhiko Katsuma, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 46 days.

(21) Appl. No.: 15/756,180

(22) PCT Filed: Sep. 7, 2016

(86) PCT No.: PCT/JP2016/076257
§ 371 (c)(1),
(2) Date: Feb. 28, 2018

(87) PCT Pub. No.: WO2017/043508
PCT Pub. Date: Mar. 16, 2017

(65) Prior Publication Data
US 2018/0251613 A1 Sep. 6, 2018

(30) Foreign Application Priority Data

Sep. 11, 2015 (JP) ................. 2015-179020
Nov. 12, 2015 (JP) ................. 2015-221979
Dec. 22, 2015 (JP) ................. 2015-249789

(51) Int. Cl.
| | |
|---|---|
| *C08J 5/18* | (2006.01) |
| *B65D 65/46* | (2006.01) |
| *C08K 5/053* | (2006.01) |
| *C08L 29/04* | (2006.01) |
| *C11D 17/04* | (2006.01) |

(52) U.S. Cl.
CPC ............. *C08J 5/18* (2013.01); *B65D 65/46* (2013.01); *C08K 5/053* (2013.01); *C08L 29/04* (2013.01); *C11D 17/043* (2013.01); *C08J 2329/04* (2013.01); *C08L 2203/16* (2013.01)

(58) Field of Classification Search
CPC .... C11D 17/043; C08L 29/04; C08L 2203/16; C08J 5/18; C08J 2329/04; C08K 5/053; B65D 65/46
USPC ........................................................ 524/386
See application file for complete search history.

(56) References Cited

U.S. PATENT DOCUMENTS

| | | |
|---|---|---|
| 2004/0092635 A1 | 5/2004 | Kitamura et al. |
| 2008/0146481 A1 | 6/2008 | Brown et al. |
| 2008/0176985 A1 | 7/2008 | Verrall |
| 2011/0186468 A1 | 8/2011 | Denome et al. |
| 2014/0199460 A1* | 7/2014 | Lee ................. C08L 1/286 426/548 |
| 2014/0356603 A1 | 12/2014 | Kumar et al. |
| 2017/0233539 A1 | 8/2017 | Friedrich et al. |

FOREIGN PATENT DOCUMENTS

| | | |
|---|---|---|
| EP | 3348605 A1 | 7/2018 |
| EP | 3348606 A1 | 7/2018 |
| EP | 3348607 A1 | 7/2018 |
| EP | 3348608 A1 | 7/2018 |
| JP | H09-272772 A | 10/1997 |
| JP | 2001-288321 A | 10/2001 |
| JP | 2001-329130 A | 11/2001 |
| JP | 2004-161823 A | 6/2004 |
| JP | 2005-194295 A | 7/2005 |
| JP | 2013-518009 A | 5/2013 |
| WO | 2008/142835 A1 | 11/2008 |
| WO | 2016/061026 A1 | 4/2016 |

OTHER PUBLICATIONS

International Search Report from Patent Application No. PCT/JP2016/076257, dated Dec. 13, 2016.
International Preliminary Report on Patentability from Patent Application No. PCT/JP2016/076257, dated Mar. 13, 2018.
European Search Report, European Patent Office, Patent Application No. 16844369.5, dated Apr. 17, 2019.

* cited by examiner

*Primary Examiner* — William K Cheung
(74) *Attorney, Agent, or Firm* — Greenblum & Bernstein, P.L.C.

(57) ABSTRACT

A water-soluble film is provided, which has excellent mechanical properties (higher tensile strength and higher tensile elongation) and can be formed into an excellent package which is free from deterioration of the tension of the water-soluble film over time even if containing liquid such as a liquid detergent packaged therein. The water-soluble film includes: (A) a polyvinyl alcohol resin; and (B) a plasticizer; wherein the plasticizer (B) includes a polyalcohol (b1) having a melting point of at least 80° C. and a polyalcohol (b2) having a melting point of not higher than 50° C.; wherein the plasticizer (B) is present in a proportion of at least 25 parts by weight based on 100 parts by weight of the polyvinyl alcohol resin (A).

13 Claims, No Drawings

WATER-SOLUBLE FILM AND CHEMICAL AGENT PACKAGE

This application is a U.S. National Stage Application under 35 U.S.C. § 371 of PCT International Application No. PCT/JP2016/076257 filed Sep. 7, 2015, which claims the priority benefit of Japan Patent Application No. 2015-179020, filed on Sep. 11, 2015, Japan Patent Application No. 2015-249789, filed on Dec. 22, 2015, and Japan Patent Application No. 2015-221979, filed on Nov. 12, 2015, in the Japan Patent Office, the disclosures of which are incorporated herein in their entirety by reference.

TECHNICAL FIELD

The present disclosure relates to a water-soluble film containing a polyvinyl alcohol resin (polyvinyl alcohol hereinafter abbreviated to "PVA") as a major component (hereinafter sometimes referred to as "PVA film"). More specifically, the present disclosure relates to a water-soluble film which has excellent mechanical properties (higher tensile strength and higher tensile elongation) and can be formed into an excellent package which is free from deterioration of the tension of the water-soluble film over time even if containing liquid such as a liquid detergent packaged therein, and to a chemical agent package produced by using the water-soluble film.

BACKGROUND ART

PVA films are made of PVA resins which are thermoplastic and yet water-soluble. The PVA films are significantly different in various film properties and texture than hydrophobic films such as polyethylene terephthalate films and polyolefin films which are generally used as packaging films.

Conventionally, chemical agent portion packages (unit packages) have been proposed which each include a bag formed from a PVA resin film and a chemical agent such as an agricultural chemical or a detergent contained in the bag, and take advantage of the water solubility of the PVA resin. The unit packages are used in a wide variety of applications.

Known examples of the PVA resin film to be used for the water-soluble unit packages in such applications include: a water-soluble film (see, for example, PTL 1) which comprises 100 parts by weight of a PVA, 5 to 30 parts by weight of a plasticizer, 1 to 10 parts by weight of starch and 0.01 to 2 parts by weight of a surfactant; and a water-soluble film (see, for example, PTL 2) which comprises 100 parts by weight of an anionic group-modified PVA resin (A) having a 4 wt. % aqueous solution viscosity of 10 to 35 mPa·s as measured at 20° C., an average saponification degree of 80.0 to 99.9 mol % and an anionic group modification degree of 1 to 10 mol %, 20 to 50 parts by weight of a plasticizer (B), 2 to 30 parts by weight of a filler (C) and 0.01 to 2.5 parts by weight of a surfactant (D).

RELATED ART DOCUMENT

Patent Documents

PTL 1: JP-A-2001-329130
PTL 2: JP-A-2004-161823

SUMMARY OF INVENTION

The water-soluble films disclosed in PTL 1 and PTL 2 are highly water-soluble, and can be used for chemical agent packages in which a liquid detergent or the like is packaged. When the chemical agent packages are stored, however, the water-soluble film is liable to lose tension over time, deteriorating the appearance and the texture of the packages. Hence, there is a demand for a water-soluble film which can be formed into an excellent package free from the deterioration of the tension of the water-soluble film over time.

In view of the foregoing, the present disclosure provides a water-soluble film which has excellent mechanical properties (higher tensile strength and higher tensile elongation) and can be formed into an excellent package which is free from deterioration of the tension of the water-soluble film over time even if containing liquid such as a liquid detergent packaged therein, and a chemical agent package which is produced by packaging any of various chemical agents with the water-soluble film.

The inventors conducted intensive studies in view of the foregoing and, as a result, found that, where the water-soluble film comprises a PVA resin as a major component, a plasticizer having a higher melting point and a plasticizer having a lower melting point, and the plasticizers are present in a relatively great amount in the film, the water-soluble film has satisfactory water solubility and excellent mechanical properties (higher tensile strength and higher tensile elongation), and can be formed into an excellent package which is free from deterioration of the tension of the water-soluble film over time even if containing liquid such as a liquid detergent packaged therein.

According to a first inventive aspect, there is provided a water-soluble film which comprises: (A) a PVA resin; and (B) a plasticizer; wherein the plasticizer (B) includes a polyalcohol (b1) having a melting point of at least 80° C. and a polyalcohol (b2) having a melting point of at most 50° C.; wherein the plasticizer (B) is present in a proportion of at least 25 parts by weight based on 100 parts by weight of the PVA resin (A).

According to a second inventive aspect, the polyalcohol (b1) having a melting point of at least 80° C. and the polyalcohol (b2) having a melting point of at most 50° C. for the plasticizer (B) are present in a weight ratio (b1/b2) of 0.1 to 5 in the water-soluble film of the first inventive aspect.

According to a third inventive aspect, the polyalcohol (b1) having a melting point of at least 80° C. and the polyalcohol (b2) having a melting point of at most 50° C. for the plasticizer (B) are present in a weight ratio (b1/b2) of 0.1 to 0.9 in the water-soluble film of the first inventive aspect or the second inventive aspect.

Further, the present disclosure provides a chemical agent package produced by using the water-soluble film.

The inventive water-soluble film has satisfactory water solubility and excellent mechanical properties (higher tensile strength and higher tensile elongation), and can be formed into an excellent package which is free from deterioration of the tension of the water-soluble film over time even if containing liquid such as a liquid detergent packaged therein. The inventive water-soluble film is usable for a variety of packaging applications, and is particularly useful for a unit packaging application for packaging a chemical agent or the like.

Where the polyalcohol (b1) having a melting point of at least 80° C. and the polyalcohol (b2) having a melting point of at most 50° C. for the plasticizer (B) are present in a weight ratio (b1/b2) of 0.1 to 5 in the water-soluble film, the water-soluble film is free from blocking, and unlikely to be brittle even in a lower humidity environment.

Where the polyalcohol (b1) having a melting point of at least 80° C. and the polyalcohol (b2) having a melting point of at most 50° C. for the plasticizer (B) are present in a weight ratio (b1/b2) of 0.1 to 0.9 in the water-soluble film, the water-soluble film is free from blocking and bleeding of the plasticizer.

Where the polyalcohol (b1) having a melting point of at least 80° C. has at least four hydroxyl groups per molecule, the polyalcohol (b1) is highly compatible with the PVA resin.

Where the polyalcohol (b1) having a melting point of at least 80° C. has a molecular weight of at least 150, the water-soluble film is highly tense.

Where the polyalcohol (b2) having a melting point of at most 50° C. has not more than four hydroxyl groups per molecule, the flexibility of the water-soluble film at around a room temperature (25° C.) can be easily controlled.

Where the polyalcohol (b2) having a melting point of at most 50° C. has a molecular weight of at most 100, the flexibility of the water-soluble film can be more easily controlled.

Where the PVA resin (A) includes an anionic group-modified PVA resin, the water-soluble film has higher water solubility.

Where the PVA resin (A) includes both an anionic group-modified PVA resin and an unmodified PVA, the water-soluble film is more excellent in water sealability.

Where the water-soluble film has a water content of 3 to 15 wt. %, the water-soluble film is more excellent in mechanical strength and sealability.

DESCRIPTION OF EMBODIMENTS

The present disclosure will hereinafter be described more specifically.

The inventive water-soluble film contains: (A) a PVA resin; and (B) a plasticizer.

First, the PVA resin (A) to be used in the present disclosure will be described.

Examples of the PVA resin (A) to be used in the present disclosure include an unmodified PVA and a modified PVA resin.

The PVA resin (A) to be used in the present disclosure preferably has an average saponification degree of at least 80 mol %, particularly preferably 82 to 99.9 mol %, more preferably 85 to 98.5 mol %, especially preferably 90 to 97 mol %. Where the unmodified PVA is used as the PVA resin (A), the unmodified PVA preferably has an average saponification degree of at least 80 mol %, particularly preferably 82 to 99 mol %, more preferably 85 to 90 mol %. Where the modified PVA resin is used as the PVA resin (A), the modified PVA resin preferably has an average saponification degree of at least 80 mol %, particularly preferably 85 to 99.9 mol %, more preferably 90 to 98 mol %. Further, where an anionic group-modified PVA resin is used as the PVA resin (A), the anionic group-modified PVA resin preferably has an average saponification degree of at least 85 mol %, particularly preferably 88 to 99 mol %, more preferably 90 to 97 mol %. If the saponification degree is excessively small, the water solubility of the water-soluble film tends to be reduced over time depending on the pH of a chemical agent to be packaged with the water-soluble film. If the average saponification degree is excessively great, the water solubility of the water-soluble film tends to be significantly reduced due to thermal history experienced during film formation.

The polymerization degree of the PVA resin (A) is generally expressed by an aqueous solution viscosity. The PVA resin (A) preferably has a 4 wt. % aqueous solution viscosity of 5 to 50 mPa·s, more preferably 10 to 45 mPa·s, particularly preferably 15 to 40 mPa·s, as measured at 20° C. Where the unmodified PVA is used as the PVA resin (A), the unmodified PVA preferably has a 4 wt. % aqueous solution viscosity of 5 to 50 mPa·s, more preferably 10 to 45 mPa·s, particularly preferably 15 to 40 mPa·s, as measured at 20° C. Where the modified PVA resin is used as the PVA resin (A), the modified PVA resin preferably has a 4 wt. % aqueous solution viscosity of 5 to 50 mPa·s, more preferably 10 to 45 mPa·s, particularly preferably 15 to 40 mPa·s, as measured at 20° C. If the viscosity is excessively low, the mechanical strength of the water-soluble film as a packaging material tends to be reduced. If the viscosity is excessively high, on the other hand, the productivity of the film tends to be reduced because of a higher aqueous solution viscosity during the film formation.

The average saponification degree described above is measured in conformity with JIS K6726 3.5, and the 4 wt. % aqueous solution viscosity is measured in conformity with JIS K6726 3.11.2.

Examples of the modified PVA resin to be used in the present disclosure include an anionic group-modified PVA resin, a cationic group-modified PVA resin and a nonionic group-modified PVA resin. Particularly, the anionic group-modified PVA resin is preferably used because of its water solubility. Examples of the anionic group include a carboxyl group, a sulfonic acid group and a phosphoric acid group. For chemical resistance and long-term stability, the carboxyl group and the sulfonic acid group are preferred, and the carboxyl group is particularly preferred.

In the present disclosure, the modification degree of the anionic group-modified PVA resin is preferably 1 to 10 mol %, more preferably 2 to 9 mol %, particularly preferably 2 to 8 mol %, especially preferably 3 to 7 mol %. If the modification degree is excessively low, the water solubility tends to be reduced. If the modification degree is excessively high, the PVA resin tends to have lower productivity and lower biodegradability, and is liable to cause blocking and, therefore, is less practical.

In the present disclosure, the PVA resins described above may be each used alone as the PVA resin (A), or the unmodified PVA and the modified PVA resin may be used in combination. Further, two or more types of PVA resins having different saponification degrees, different viscosities, different modifying groups and different modification degrees may be used in combination. In the present disclosure, the PVA resin (A) preferably includes the modified PVA resin. Particularly, the PVA resin (A) preferably includes the anionic group-modified PVA resin, or the anionic-group modified PVA resin and the unmodified PVA. The PVA resin (A) particularly preferably includes the anionic group-modified PVA resin and the unmodified PVA.

The weight ratio between the modified PVA resin and the unmodified PVA is preferably 95/5 to 60/40, particularly preferably 94/6 to 70/30, more preferably 93/7 to 80/20. If the weight ratio is excessively low, the plasticizer is liable to bleed. If the weight ratio is excessively high, the blocking is liable to occur.

Where the modified PVA resin and the unmodified PVA are used in combination, the unmodified PVA preferably has a 4 wt. % aqueous solution viscosity of 5 to 50 mPa·s, more preferably 8 to 45 mPa·s, particularly preferably 12 to 40 mPa·s, especially preferably 15 to 35 mPa·s, as measured at 20° C. If the viscosity is excessively low, the mechanical strength of the water-soluble film as the packaging material tends to be reduced. If the viscosity is excessively high, the productivity of the film tends to be reduced because of a higher aqueous solution viscosity during the film formation.

The inventive water-soluble film is produced, for example, in the following manner.

The unmodified PVA may be prepared by saponifying a vinyl ester polymer prepared by polymerization of a vinyl ester compound.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate and vinyl stearate. Particularly, vinyl acetate is preferably used as the vinyl ester compound. The aforementioned vinyl ester compounds may be used alone or in combination.

The modified PVA resin may be prepared, for example, by copolymerizing the vinyl ester compound and an unsaturated monomer copolymerizable with the vinyl ester compound and then saponifying the resulting copolymer, or by post-modifying the unmodified PVA.

In the present disclosure, the copolymerizable unsaturated monomer may be copolymerized with the vinyl ester compound. For the preparation of the modified PVA resin, the unsaturated monomer to be copolymerized should contain a modifying group. Examples of the unsaturated monomer include olefins such as ethylene, propylene, isobutylene, α-octene, α-dodecene and α-octadecene; hydroxyl-containing α-olefins such as 3-butene-1-ol, 4-pentene-1-ol and 5-hexene-1-ol, and acylation products and other derivatives of these hydroxyl-containing α-olefins; unsaturated acids such as acrylic acid, methacrylic acid, crotonic acid, maleic acid, maleic anhydride, itaconic acid and undecylenic acid, and salts, monoesters and dialkyl esters of these unsaturated acids; amides such as diacetone acrylamide, acrylamide and methacrylamide; and olefin sulfonic acids such as ethylene sulfonic acid, allyl sulfonic acid and methallyl sulfonic acid, and salts of these olefin sulfonic acids, which may be used alone or in combination. The proportion of the copolymerizable monomer is typically at most 10 mol %.

The modified PVA resin has a primary hydroxyl group at its side chain, and the number of primary hydroxyl groups is typically 1 to 5, preferably 1 to 2, particularly preferably 1. Particularly, the modified-PVA resin preferably has a secondary hydroxyl group in addition to the primary hydroxyl group. Examples of the modified PVA resin include a PVA resin having a 1,2-diol structural unit at its side chain, and a PVA resin having a hydroxyalkyl group at its side chain. The PVA resin having the 1,2-diol structural unit at its side chain may be prepared by: (i) saponifying a copolymer of vinyl acetate and 3,4-diacetoxy-1-butene; (ii) saponifying and decarbonating a copolymer of vinyl acetate and vinyl ethylene carbonate; (iii) saponifying and deketalizing a copolymer of vinyl acetate and 2,2-dialkyl-4-vinyl-1,3-dioxolane; and (iv) saponifying a copolymer of vinyl acetate and glycerin monoallyl ether.

Exemplary polymerization methods to be used for the preparation of the PVA resin (A) include a solution polymerization method, an emulsion polymerization method, a suspension polymerization method and other conventionally known polymerization methods. A solution polymerization method using a lower alcohol such as methanol, ethanol or isopropyl alcohol as a solvent is typically employed. Where the modified PVA resin is prepared by the solution polymerization method, the polymerization is started, for example, with the whole amount of the vinyl ester compound and a part of the hydroxyl-containing unsaturated monomer fed as the monomers, and allowed to proceed by continuously or dividedly adding the rest of the unsaturated monomer during the polymerization. Alternatively, the whole amounts of the vinyl ester compound and the carboxyl-containing unsaturated monomer are simultaneously fed as the monomers for the polymerization.

A polymerization catalyst may be properly selected from azo catalysts such as azobisisobutyronitrile, peroxide catalysts such as acetyl peroxide, benzoyl peroxide and lauroyl peroxide, and other conventionally known polymerization catalysts according to the polymerization method. The polymerization reaction temperature may be selected from a range between about 50° C. and the boiling point of the polymerization catalyst.

The resulting copolymer is dissolved in an alcohol, and saponified in the presence of a saponification catalyst. Examples of the alcohol include C1 to C5 alcohols such as methanol, ethanol and butanol, which may be used alone or in combination. The concentration of the copolymer in the alcohol may be selected from a range between 20 and 50 wt. %.

Usable examples of the saponification catalyst include alkali catalysts including hydroxides and alcoholates of alkali metals such as sodium hydroxide, potassium hydroxide, sodium methylate, sodium ethylate and potassium methylate, and acid catalysts. The catalyst is used in an amount of 1 to 100 mmol equivalent relative to the vinyl ester compound. These saponification catalysts may be used alone or in combination.

A carboxyl group-modified PVA resin for the modified PVA resin may be prepared by any method. Examples of the method include: (I) a method in which a carboxyl-containing unsaturated monomer and a vinyl ester compound are copolymerized and then the resulting copolymer is saponified; and (II) a method in which a vinyl ester compound is polymerized in the presence of a carboxyl-containing alcohol, aldehyde or thiol as a chain transfer agent and the resulting polymer is saponified.

Examples of the vinyl ester compound to be used in the method (I) or (II) include those described above, and vinyl acetate is preferably used.

Examples of the carboxyl-containing unsaturated monomer to be used in the method (I) include ethylenically unsaturated dicarboxylic acids (maleic acid, fumaric acid, itaconic acid and the like), ethylenically unsaturated dicarboxylic acid monoesters (monoalkyl maleates, monoalkyl fumarates, monoalkyl itaconates and the like), ethylenically unsaturated dicarboxylic acid diesters (dialkyl maleates, dialkyl fumarates, dialkyl itaconates and the like) which need conversion to carboxyl groups by hydrolysis in the saponification, ethylenically unsaturated carboxylic anhydrides (maleic anhydride, itaconic anhydride and the like), ethylenically unsaturated monocarboxylic acids ((meth)acrylic acid, crotonic acid and the like), and salts of these compounds. Particularly, maleic acid, a monoalkyl maleate, a dialkyl maleate, a maleic acid salt, maleic anhydride, itaconic acid, a monoalkyl itaconate, a dialkyl itaconate, (meth)acrylic acid or the like is preferably used. More preferably, maleic acid, the monoalkyl maleate, the dialkyl maleate, the maleic acid salt or maleic anhydride is used. Particularly preferably, the monoalkyl maleate is used. These carboxyl-containing unsaturated monomers may be used alone or in combination.

In the method (II), a compound derived from the thiol having a greater chain transfer effect is effective, and examples of the effective compound include compounds represented by the following general formulae (1) to (3):

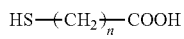

wherein n is an integer of 0 to 5.

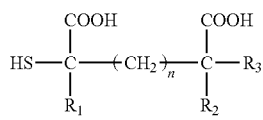

wherein n is an integer of 0 to 5, and $R_1$, $R_2$ and $R_3$ are each a hydrogen atom or a lower alkyl group (which may have a substituent).

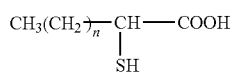

wherein n is an integer of 0 to 20.

The thiol-derived compound may be a salt of any of the compounds represented by the above general formulae (1) to (3). Specific examples of the salt include mercaptoacetic acid salts, 2-mercaptopropionic acid salts, 3-mercaptopropionic acid salts and 2-mercaptostearic acid salts, which may be used alone or in combination.

The preparation method for the carboxyl group-modified PVA resin is not limited to the aforementioned methods. For example, the PVA resin (partially saponified PVA resin or completely saponified PVA resin) is allowed to post-react with a carboxyl-containing compound, such as a dicarboxylic acid, an aldehyde carboxylic acid or a hydroxycarboxylic acid, having a functional group reactive with a hydroxyl group.

Where a sulfonic acid-modified PVA resin modified with a sulfonic acid group is used, the sulfonic acid-modified PVA resin may be prepared by copolymerizing a vinyl ester compound with a comonomer of sulfonic acid such as vinylsulfonic acid, styrenesulfonic acid, allylsulfonic acid, methallylsulfonic acid or 2-acrylamido-2-methylpropanesulfonic acid, or a salt of any of these sulfonic acids and saponifying the resulting copolymer, or by introducing vinylsulfonic acid or its salt, or 2-acrylamido-2-methylpropanesulfonic acid or its salt into the PVA resin by Michael addition reaction.

On the other hand, exemplary methods for the post-modification of the unmodified PVA are acetoacetic acid esterification, acetalization, urethanation, etherification, grafting, phosphoric acid esterification and oxyalkylenation of the unmodified PVA:

Other general monomer may be copolymerized with the carboxyl-containing unsaturated monomer and the vinyl ester compound, as long as the water solubility is not impaired. Examples of the general monomer include alkyl esters of ethylenically unsaturated carboxylic acids, allyl esters of saturated carboxylic acids, α-olefins, alkyl vinyl ethers, alkyl allyl ethers, (meth)acrylamide, (meth)acrylonitrile, styrene and vinyl chloride, which may be used alone or in combination.

In the present disclosure, where the water-soluble film is formed into a chemical agent package, the water-soluble film is preferably imparted with flexibility by adding the plasticizer (B) to the PVA resin (A). It is important to use at least two types of plasticizers in combination as the plasticizer (B) rather than using a single type of plasticizer.

The plasticizer (B) includes a polyalcohol (b1) having a melting point of at least 80° C. (hereinafter sometimes referred to simply as plasticizer (b1)), and a polyalcohol (b2) having a melting point of at most 50° C. (hereinafter sometimes referred to simply as plasticizer (b2)).

Most of sugar alcohols, monosaccharides and polysaccharides are usable as the polyalcohol (b1) having a melting point of at least 80° C. Examples of the polyalcohol (b1) include: divalent alcohols such as salicyl alcohol (83° C.), catechol (105° C.), resorcinol (110° C.), hydroquinone (172° C.), bisphenol-A (158° C.), bisphenol-F (162° C.) and neopentyl glycol (127° C.); trivalent alcohols such as phloroglucinol (218° C.); tetravalent alcohols such as erythritol (121° C.), threitol (88° C.) and pentaerythritol (260° C.); pentavalent alcohols such as xylitol (92° C.), arabitol (103° C.), fucitol (153° C.), glucose (146° C.) and fructose (104° C.); hexavalent alcohols such as mannitol (166° C.), sorbitol (95° C.) and inositol (225° C.); octavalent alcohols such as lactitol (146° C.), sucrose (186° C.) and trehalose (97° C.); and nonavalent and higher-valent alcohols such as maltitol (145° C.), which may be used alone or in combination. Parenthesized numerals indicate the melting points of the respective compounds.

Among the aforementioned polyalcohols, polyalcohols having a melting point of at least 85° C. are preferred, and polyalcohols having a melting point of at least 90° C. are particularly preferred for the tensile strength of the water-soluble film. The upper limit of the melting point is preferably 300° C., particularly preferably 200° C.

In the present disclosure, the plasticizer (b1) preferably has, per molecule, at least 4 hydroxyl groups, more preferably 5 to 10 hydroxyl groups, particularly preferably 6 to 8 hydroxyl groups, for compatibility with the PVA resin. Specifically, for example, sorbitol, sucrose, trehalose or the like is preferred.

In the present disclosure, the plasticizer (b1) preferably has a molecular weight of at least 150, more preferably 160 to 500, particularly preferably 180 to 400, for the tension of the water-soluble film. Specifically, for example, sorbitol, sucrose or the like is preferred.

On the other hand, most of aliphatic alcohols are usable as the polyalcohol (b2) having a melting point of at most 50° C. Preferred examples of the polyalcohol (b2) include: divalent alcohols such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol and polyethylene glycols having a molecular weight of at most 2,000; and trivalent or higher-valent alcohols such as glycerin (18° C.), diglycerin and triethanolamine (21° C.). For flexibility of the water-soluble film, the melting point is preferably at most 30° C., particularly preferably at most 20° C. The lower limit of the melting point is typically −80° C., preferably −10° C., particularly preferably 0° C. These polyalcohols may be used alone or in combination. Parenthesized numerals indicate the melting points of the respective compounds.

In the present disclosure, the plasticizer (b2) preferably has, per molecule, 4 or less hydroxyl groups, particularly preferably 3 or less hydroxyl groups, for easier control of the flexibility of the water-soluble film at around the room temperature (25° C.). Specifically, for example, glycerin or the like is preferred.

In the present disclosure, the plasticizer (b2) preferably has a molecular weight of at most 100, more preferably 50 to 100, particularly preferably 60 to 95, for easier control of the flexibility of the water-soluble film. Specifically, for example, glycerin or the like is preferred.

In the present disclosure, an additional plasticizer (b3) may be used in combination with the aforementioned plasticizers (b1) and (b2). Examples of the plasticizer (b3) include: alcohols such as trimethylolpropane (58° C.), diethylene glycol monomethyl ether, cyclohexanol, carbitol and polypropylene glycol; ethers such as dibutyl ether; carboxylic acids such as stearic acid, oleic acid, linoleic acid, linolenic acid, sorbic acid, citric acid and adipic acid; ketones such as cyclohexanone; amines such as monoethanolamine, triethanolamine, ethylenediamine and imidazole compounds; and amino acids such as alanine, glycine, aspartic acid, glutamic acid, histidine, lysine and cysteine, which may be used alone or in combination.

In the present disclosure, the proportion of the plasticizer (B) is preferably at least 25 parts by weight, particularly preferably 27 to 70 parts by weight, more preferably 30 to 60 parts by weight, especially preferably 35 to 50 parts by weight, based on 100 parts by weight of the PVA resin (A). If the proportion of the plasticizer (B) is excessively small, the water-soluble film tends to lose its tension over time when liquid such as a liquid detergent is packaged in a package formed from the water-soluble film. If the proportion of the plasticizer (B) is excessively great, the water-soluble film tends to have a lower mechanical strength.

The weight ratio (b1/b2) between the plasticizer (b1) and the plasticizer (b2) is preferably 0.1 to 5, particularly preferably 0.2 to 4.5, more preferably 0.5 to 4, especially preferably 0.7 to 3. If the weight ratio is excessively low, the water-soluble film tends to be excessively soft, thereby suffering from the blocking. If the weight ratio is excessively high, the water-soluble film tends to be excessively hard to be thereby brittle in a lower humidity environment.

For suppression of the bleeding of the plasticizer, the weight ratio (b1/b2) between the plasticizer (b1) and the plasticizer (b2) is preferably 0.1 to 0.9, particularly preferably 0.15 to 0.8, more preferably 0.2 to 0.7, especially preferably 0.25 to 0.6.

The proportion of the plasticizer (b1) is preferably 5 to 40 parts by weight, more preferably 8 to 30 parts by weight, particularly preferably 10 to 25 parts by weight, based on 100 parts by weight of the PVA resin (A), and the proportion of the plasticizer (b2) is preferably 5 to 40 parts by weight, more preferably 10 to 35 parts by weight, particularly preferably 15 to 30 parts by weight, based on 100 parts by weight of the PVA resin (A).

If the proportion of the plasticizer (b1) is excessively small, the water-soluble film tends to be excessively soft, thereby suffering from the blocking. If the proportion of the plasticizer (b1) is excessively great, the water-soluble film tends to be excessively hard to be thereby brittle in the lower humidity environment. If the proportion of the plasticizer (b2) is excessively small, the water-soluble film tends to be excessively hard to be thereby brittle in the lower humidity environment. If the proportion of the plasticizer (b2) is excessively great, the water-soluble film tends to be excessively soft, thereby suffering from the blocking.

Further, the total proportion of the plasticizer (b1) and the plasticizer (b2) preferably accounts for at least 70 wt. %, more preferably at least 80 wt. %, particularly preferably at least 87 wt. %, especially preferably at least 90 wt. %, further preferably at least 95 wt. %, of the plasticizer (B). Particularly preferably, the plasticizer (B) includes only the plasticizer (b1) and the plasticizer (b2). If the total proportion of the plasticizers (b1) and (b2) is excessively small, the water-soluble film tends to have a lower mechanical strength.

In the present disclosure, as required, the water-soluble film further contains a filler (C), a surfactant (D) and/or the like.

In the present disclosure, the filler (C) is used to impart the water-soluble film with an antiblocking property. Examples of the filler (C) include an inorganic filler and an organic filler. Particularly, the organic filler is preferred. The filler (C) preferably has an average particle diameter of 0.1 to 20 µm, more preferably 0.5 to 15 µm. The average particle diameter may be measured, for example, by means of a particle size distribution measuring apparatus of laser diffraction type or the like.

The inorganic filler preferably has an average particle diameter of 1 to 10 µm. If the average particle diameter is excessively small, the water-soluble film tends to have a lower water dispersing effect. If the average particle diameter is excessively great, the water-soluble film tends to suffer from a pinhole when being stretched in the film formation, resulting in poorer appearance.

Specific examples of the inorganic filler include talc, clay, silicon dioxide, diatom earth, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, potassium chromate and calcium citrate, which may be used alone or in combination.

The organic filler preferably has an average particle diameter of 0.5 to 20 µm, more preferably 0.5 to 10 µm, particularly preferably 0.5 to 7 µm, further preferably 0.5 to 5 µm. If the average particle diameter is excessively small, the costs tend to be increased. If the average particle diameter is excessively great, the water-soluble film tends to suffer from a pinhole when being stretched in the film formation.

Examples of the organic filler include starch, melamine resins, polymethyl (meth)acrylate resins, polystyrene resins, polylactic acids and other biodegradable resins. Particularly, biodegradable resins such as the polymethyl (meth)acrylate resins, the polystyrene resins and the starch are preferably used. These organic fillers may be used alone or in combination.

Examples of the starch include raw starches (corn starch, potato starch, sweet potato starch, wheat starch, Kissaba starch, sago starch, tapioca starch, sorghum starch, rice starch, pea starch, kudzu starch, bracken starch, lotus starch, water chestnut starch and the like), physically modified starches (α-starch, fractionated amylose, moist heat-treated starch and the like), enzyme-modified starches (hydrolyzed dextrin, enzyme-decomposed dextrin, amylose and the like), chemically degraded starches (acid-treated starch, hypochlorous acid-oxidized starch, dialdehyde starch and the like), chemically modified starch derivatives (esterified starch, etherified starch, cationized starch, crosslinked starch and the like). Among the aforementioned starches, the raw starches, particularly the corn starch and the rice starch, are preferably used from the viewpoint of availability and economy. These starches may be used alone or in combination.

The proportion of the filler (C) is preferably 1 to 30 parts by weight, more preferably 2 to 25 parts by weight, particularly preferably 2.5 to 20 parts by weight, based on 100 parts by weight of the PVA resin (A). If the proportion of the filler (C) is excessively small, the water-soluble film tends to be poorer in antiblocking property. If the proportion of the filler (C) is excessively great, the water-soluble film tends to suffer from a pinhole when being stretched in the film formation.

In the present disclosure, the surfactant (D) is used for improvement of the releasability of the water-soluble film when the film is removed from a cast surface in the film formation. A nonionic surfactant, a cationic surfactant or an anionic surfactant is typically used. Examples of the nonionic surfactant include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers such as polyoxyethylene laurylamino ether and polyoxyethylene stearylamino ether, which may be used alone or in combination. Particularly, the polyoxyalkylene alkyl ether phosphate monoethanolamine salts and polyoxyethylene laurylamino ether are preferred for stable production. These surfactants may be used alone or in combination.

The proportion of the surfactant (D) is preferably 0.01 to 3 parts by weight, more preferably 0.1 to 2.5 parts by weight, particularly preferably 0.5 to 2 parts by weight, based on 100 parts by weight of the PVA resin (A). If the proportion of the surfactant (D) is excessively small, the water-soluble film tends to have poorer releasability when being removed from a cast surface of a film forming apparatus in the film formation, thereby reducing the productivity. If the proportion of the surfactant (D) is excessively great, the water-soluble film tends to suffer from inconvenience, e.g., the water-soluble film is liable to have a reduced adhesive strength when being formed into a package by sealing.

In the present disclosure, the water-soluble film may contain an additional water-soluble polymer (e.g., polysodium acrylate, polyethylene oxide, polyvinyl pyrrolidone, dextrin, chitosan, chitin, methylcellulose, hydroxyethylcellulose or the like), a perfume, a rust preventing agent, a colorant, a bulking agent, a defoaming agent, a UV absorber, liquid paraffins, a fluorescent brightener and a bitter component (e.g., denatonium benzoate or the like), as long as the object of the present disclosure is not impaired. These may be used alone or in combination.

In the present disclosure, an antioxidant is preferably blended for suppression of yellowing. Examples of the antioxidant include sulfites such as sodium sulfite, potassium sulfite, calcium sulfite and ammonium sulfite, tartaric acid, ascorbic acid, sodium thiosulfate, catechol and Rongalite, among which the sulfites are preferred and sodium sulfite is particularly preferred. The proportion of the antioxidant is preferably 0.1 to 10 parts by weight, more preferably 0.2 to 5 parts by weight, particularly preferably 0.3 to 3 parts by weight, based on 100 parts by weight of the PVA resin (A).

In the present disclosure, a resin composition which contains the PVA resin (A), the plasticizer (B) and, as required, the filler (C) and the surfactant (D) is prepared. A film forming material is prepared by dissolving or dispersing the resin composition in water, and formed into a PVA film (water-soluble film). A melt-extrusion process, a flow casting process or the like may be employed for the film formation. The flow casting process is preferred for the accuracy of the film thickness.

In the present disclosure, the flow casting process is performed, for example, in the following manner.

For the dissolution, an ordinary-temperature dissolving method, a higher-temperature dissolving method, a higher-pressure dissolving method or the like is employed. Particularly, the higher-temperature dissolving method and the higher-pressure dissolving method are preferred because the resin composition is less liable to be left undissolved and the productivity is higher.

In the higher-temperature dissolving method, the dissolving temperature is typically 80° C. to 100° C., preferably 90° C. to 100° C. In the higher-pressure dissolving method, the dissolving temperature is typically 80° C. to 130° C., preferably 90° C. to 120° C.

The dissolving period is typically 1 to 20 hours, preferably 2 to 15 hours, more preferably 3 to 10 hours. If the dissolving period is excessively short, the resin composition tends to be left undissolved. If the dissolving period is excessively long, the productivity tends to be reduced.

In the dissolving step, a paddle, a full-zone stirring blade, a max-blend stirring blade, a twister, an anchor stirring blade, a ribbon, a propeller or the like is used as a stirring blade.

After the dissolving step, the resulting PVA resin aqueous solution is degassed. Exemplary degassing methods include a static degassing method, a vacuum degassing method and a twin-screw extrusion degassing method. Particularly, the static degassing method and the twin-screw extrusion degassing method are preferred.

The temperature for the static degassing method is typically 50° C. to 100° C., preferably 70° C. to 95° C., and the degassing period is typically 2 to 30 hours, preferably 5 to 20 hours.

In the flow casting process, for example, a PVA resin aqueous solution is prepared by adding water to the PVA resin (A) (in a powdery form), and then the plasticizer (B) and the other ingredients are added to the PVA resin aqueous solution. Thus, an aqueous dispersion or an aqueous solution of the resin composition is prepared. Alternatively, water is added to the resin composition containing the PVA resin (A), the plasticizer (B) and the other ingredients, whereby the aqueous dispersion or the aqueous solution of the resin composition is prepared. The aqueous dispersion or the aqueous solution of the resin composition preferably has a solid concentration of 10 to 50 wt. %, particularly preferably 15 to 40 wt. %, more preferably 20 to 35 wt. %. If the solid concentration is excessively low, the productivity of the water-soluble film tends to be reduced. If the solid concentration is excessively high, the aqueous dispersion or the aqueous solution (dope) has an excessively high viscosity, so that a longer time is required for the degassing of the dope and a die line is liable to occur in the formation of the water-soluble film. Further, where the temperature of an endless belt or a drum roll metal surface is excessively low, a longer time is required for drying the aqueous dispersion or the aqueous solution. Where the temperature of the endless belt or the drum roll metal surface is excessively high, the aqueous dispersion or the aqueous solution is liable to foam in the film formation.

The aqueous dispersion or the aqueous solution is passed through a slit such as of a T-die, then flow-cast on a cast surface (e.g., the endless belt, the drum roll metal surface, a surface of a plastic base such as a polyethylene terephthalate film, or the like) and dried and, as required, heat-treated. Thus, the inventive water-soluble film (PVA film) is formed.

Conditions for the film formation are as follows.

The temperature of an outlet port through which the aqueous dispersion or the aqueous solution of the PVA resin composition is discharged is preferably 60° C. to 98° C., particularly preferably 70° C. to 95° C. If the temperature of the outlet port is excessively low, the drying period tends to be prolonged, thereby reducing the productivity. If the temperature of the outlet port is excessively high, the aqueous dispersion or the aqueous solution tends to suffer from foaming or the like.

In the film formation, the film forming rate is preferably 3 to 80 m/minute, particularly preferably 5 to 60 m/minute, more preferably 8 to 50 m/minute.

A heat roll may be used for the heat treatment. Alternatively, a floating process or a far-infrared treatment may be performed. Particularly, the heat treatment is preferably performed with the use of the heat roll for the productivity. The heat treatment temperature is preferably 50° C. to 150° C., particularly preferably 70° C. to 130° C. The heat treatment period is preferably 1 to 60 seconds, particularly preferably 3 to 50 seconds, more preferably 5 to 40 seconds.

Further, the water-soluble film may be formed by casting the aqueous dispersion or the aqueous solution of the resin composition on a metal base or a plastic base such as a polyethylene terephthalate film or a polyethylene film with the use of an applicator, and then drying the cast aqueous dispersion or solution.

The thickness of the water-soluble film may be properly selected according to the use purpose, but is preferably 10 to 120 μm, more preferably 15 to 110 μm, particularly preferably 20 to 100 μm. If the thickness of the water-soluble film is excessively small, the PVA film tends to have a lower mechanical strength. If the thickness of the water-soluble film is excessively great, the water dissolution rate tends to be reduced, and the film forming efficiency also tends to be reduced.

The width of the water-soluble film may be properly selected according to the use purpose, but is preferably 300 to 5000 mm, more preferably 500 to 4000 mm, particularly preferably 800 to 3000 mm. If the width of the water-soluble film is excessively small, the productivity tends to be reduced. If the width of the water-soluble film is excessively great, it will be difficult to control the slack of the film and the thickness of the film.

The length of the water-soluble film may be properly selected according to the use purpose, but is preferably 500 to 20000 m, more preferably 800 to 15000 m, particularly preferably 1000 to 10000 m. If the length of the water-soluble film is excessively small, troublesome film switching will be required. If the length of the water-soluble film is excessively great, the resulting film roll tends to have poorer appearance due to tight winding and an excessively great weight.

The water-soluble film may have plain surfaces, but one or both of the surfaces are preferably subjected to a texturing process as having an emboss pattern, a minute uneven pattern, a special engraved pattern or the like for the antiblocking property, slidability during processing, appearance, and for suppression of adhesion between film products.

The temperature for the texturing process is typically 60° C. to 150° C., preferably 80° C. to 140° C., and the pressure for the texturing process is typically 2 to 8 MPa, preferably 3 to 7 MPa. The period for the texturing process depends on the texturing pressure and the film forming rate, but is typically 0.01 to 5 seconds, preferably 0.1 to 3 seconds After the texturing process, as required, the water-soluble film may be subjected to a cooling process for prevention of unintended thermal stretching of the film.

In the present disclosure, the resulting water-soluble film preferably has a water content of 3 to 15 wt. %, particularly preferably 5 to 14 wt. %, more preferably 6 to 13 wt. %, for the mechanical strength and the sealability. If the water content is excessively low, the film tends to be excessively hard. If the water content is excessively high, the film tends to suffer from the blocking. The water content of the water-soluble film may be controlled by properly setting conditions for drying and moisture conditioning.

The water content is measured in conformity with JIS K6726 3.4. The resulting volatile content is defined as the water content.

In the present disclosure, the film is preferably formed, for example, at 10° C. to 35° C., particularly preferably 15° C. to 30° C. The humidity is typically at most 70% RH.

In the present disclosure, the resulting water-soluble film is wound up around a core pipe (S1) into a film roll. The resulting film roll may be supplied as a product on an as-is basis. Preferably, the water-soluble film is wound up around a core pipe (S2) having a length corresponding to a desired film width, and then supplied in the form of a film roll.

The core pipe (S1) around which the film is wound up has a hollow cylindrical shape. The material for the core pipe (S1) may be properly selected from metals and plastics, but is preferably a metal for robustness and strength.

The core pipe (S1) preferably has an inner diameter of 3 to 30 cm, more preferably 10 to 20 cm.

The core pipe (S1) preferably has a wall thickness of 1 to 30 mm, more preferably 2 to 25 mm.

The core pipe (S1) need to have a length that is greater than the width of the film, and opposite end portions of the core pipe (S1) preferably project by 1 to 50 cm from opposite ends of the film roll.

The core pipe (S2) has a hollow cylindrical shape. The material for the core pipe (S2) may be properly selected from paper, metals and plastics, but is preferably paper for weight reduction and handling ease.

The core pipe (S2) preferably has an inner diameter of 3 to 30 cm, more preferably 10 to 20 cm.

The core pipe (S2) preferably has a wall thickness of 1 to 30 mm, more preferably 3 to 25 mm.

The core pipe (S2) may have a length that is equal to or greater than the width of the PVA film product, but is preferably greater than the PVA film width by 0 cm to 50 cm.

The water-soluble film is slit as having a predetermined width when being wound around the core pipe (S2).

For the slitting, a shear blade or a leather blade is used. The water-soluble film is preferably slit by means of the shear blade from the viewpoint of the smoothness of a sectional surface of the slit film.

In the present disclosure, the resulting film roll is wrapped with a wrapping film of a resin having a water vapor barrier property. The wrapping film is not particularly limited, but a wrapping film having a water vapor permeability of at most 10 g/m$^2$·24 hr (as measured in conformity with JIS Z0208) is usable. Specific examples of the wrapping film include single-layer films such as a high-density polyethylene film, a low-density polyethylene film, a polypropylene film, a polyester film, a polyvinylidene chloride-coated polypropylene film and a glass-deposited polyester film, laminate films including any of these films, and laminate films including any of these films and a slit fabric, paper or a nonwoven fabric. Examples of the laminate films include a laminate film including a glass-deposited polyester film and a polyethylene film, and a laminate film including a polyvinylidene chloride-coated polypropylene film and a polyethylene film.

The wrapping film is preferably subjected to an antistatic process for prevention of contamination with foreign matter. The wrapping film may contain an antistatic agent incorporated therein by kneading, or may be coated with the antistatic agent. Where the antistatic agent is incorporated in the wrapping film by kneading, the antistatic agent is used in a proportion of about 0.01 to about 5 wt. % based on the weight of the resin. Where the wrapping film is coated with the antistatic agent, the antistatic agent is used in an amount of about 0.01 to about 1 g/m$^2$.

Examples of the antistatic agent include alkyl diethanolamines, polyoxyethylene alkylamines, higher fatty acid alkanolamides and sorbitan fatty acid esters.

The film roll wrapped with the wrapping film of the water vapor barrier resin is preferably further wrapped with a wrapping film of an aluminum material. Examples of the aluminum material film include an aluminum foil, a laminate film including an aluminum foil and a moisture-resistant plastic film (e.g., a laminate film including an aluminum foil and a polyethylene film), and a laminate film including an aluminum-deposited film and a moisture-resistant plastic film (e.g., a laminate film including an aluminum-deposited polyester film and a polyethylene film). In the present disclosure, a laminate film including an aluminum foil and a polyolefin film, and a laminate film including an aluminum-deposited film and a polyolefin film are particularly useful. A laminate film of a stretched polypropylene film/polyethylene film/aluminum foil/polyolefin film structure, and a laminate film of a stretched polypropylene film/low-density polyethylene film/aluminum foil structure are particularly useful.

The film roll is first wrapped with an inner wrapping film of the water vapor barrier resin and then with an outer wrapping film of the aluminum material, and widthwise margins of the wrapping films are squeezed into the core pipe.

Protection pads each having a core pipe through-hole are respectively attached to opposite ends of the inventive film roll directly or with the intervention of the wrapping film in order to prevent the ends of the film roll from being damaged or contaminated with dust or other foreign matter.

Practical examples of the protection pads include disk-shaped sheets and films conforming to the shape of the film roll. The protection pads are preferably made of a foam, a woven fabric or a nonwoven fabric so as to be imparted with a cushioning function for enhanced protection effect. Further, the protection pads may additionally contain a desiccant, or laminated with or blended with the desiccant so as to protect the film roll from moisture.

Plastics are useful as the material for the protection pads. Specific examples of the plastics include polystyrenes, polyethylenes, polypropylenes, polyesters and polyvinyl chlorides.

The desiccant-containing protection pads may be, for example, a moisture absorbing layer produced by allowing a formable material such as natural cellulose, synthetic cellulose, a glass cloth or a nonwoven fabric to contain a desiccant or a water absorbing agent such as calcium chloride, silica gel, a molecular sieve, saccharide (particularly, saccharide having a higher osmotic pressure) or a water absorbing resin by a dispersing method, an impregnating method or a coating/drying method, or by sandwiching the desiccant or the water absorbing agent between layers of the formable material or between thermoplastic resin films such as polyester films, polyethylene films, polypropylene films or TEFLON (registered trade name) films.

Commercially available examples of a desiccant sheet include AIDY SHEET available from Aidy Co., Ltd., ARROW SHEET and ZEO SHEET available from Shinagawa Chemicals Co., Ltd., and HIGHSHEET DRY available from Highsheet Kogyo Co., Ltd.

The film roll wrapped in the aforementioned manner is preferably supported in the air without contact with the floor by providing brackets (support plates) to the projecting opposite end portions of the core pipe or by resting the projecting opposite end portions on trestles and, in this state, stored or transported. Where the film roll has a relatively small width, the brackets are used. Where the film roll has a relatively great width, the trestles are used.

The brackets are each made of a plywood or a plastic plate, and dimensioned so that four edges thereof each have a length greater than the diameter of the film roll.

The pair of brackets are disposed upright in opposed relation to the projecting opposite end portions of the core pipe of the film roll, and engaged with the film roll. For the engagement, the brackets each have a through-hole formed in a center portion thereof as having a diameter slightly greater than the core pipe diameter. Alternatively, the brackets may each have a generally U-shape with a through-hole extending from a top edge thereof to a center portion thereof for easy insertion of the core pipe.

The film roll supported by the brackets is contained in a carton such as a cardboard box and, in this state, stored and transported. Where rectangular brackets are to be used, the four corners of each of the brackets are preferably cut off for smooth handling of the film roll during the storage.

Further, it is effective to firmly fix the pair of brackets to each other by a binding tape. For practical prevention of displacement and slack of the tape, the brackets may each have a tap displacement preventing groove formed in a side face (thickness-wise portion) thereof as having substantially the same width as the tape.

It is not desirable to store and transport the wrapped film roll at an excessively high temperature or an excessively low temperature or at an excessively low humidity or an excessively high humidity. Specifically, the wrapped film roll is preferably stored or transported at a temperature of 10° C. to 30° C. at a humidity of 40 to 75% RH.

The inventive water-soluble film thus produced are useful for various packaging applications. Particularly, the water-soluble film is useful for unit packaging applications for unit-packaging a chemical agent or the like. The chemical agent is not particularly limited, but may be alkaline, neutral or acidic. Further, the chemical agent may be in a granular form, a tablet form, a powdery form or a liquid form. The chemical agent is preferably dissolved or dispersed in water for use. The water-soluble film is particularly useful for packaging a liquid detergent.

The liquid detergent preferably has a pH of 6 to 12, particularly preferably 7 to 11 when being dissolved or dispersed in water. The liquid detergent preferably has a water content of at most 15 wt. %, particularly preferably 0.1 to 10 wt. %, more preferably 0.1 to 7 wt. %. Thus, the water-soluble film has satisfactory water solubility without gelation and insolubilization.

The pH is measured in conformity with JIS K3362 8.3, and the water content is measured in conformity with JIS K3362 7.21.3.

<Chemical Agent Package>

An inventive chemical agent package includes a package bag formed from the water-soluble film, and a liquid detergent contained in the package bag. The chemical agent package typically has a length of 10 to 50 mm, preferably 20 to 40 mm. The package bag formed from the water-soluble film typically has a film thickness of 10 to 120 μm, preferably 15 to 110 μm, more preferably 20 to 100 μm. The amount of the contained liquid detergent is typically 5 to 50 mL, preferably 10 to 40 mL.

The inventive chemical agent package typically has a flat surface, but an outer surface of the chemical agent package (water-soluble film) may be textured as having an emboss pattern, a minute uneven pattern, a special engraved pattern or the like for the antiblocking property, the slidability during processing and the appearance and for suppression of adhesion between products (packages). The inventive chemical agent package in which the liquid detergent is packaged maintains its shape with the liquid detergent contained therein during the storage thereof. Then, when the chemical agent package is used (for washing), the package bag (water-soluble film) is brought into contact with water, whereby the package bag is dissolved and the contained liquid detergent flows out of the package bag.

With the use of the inventive water-soluble film, the liquid detergent package is produced by a conventionally known method. Examples of the known method include: (1) a heat sealing method; (2) a water sealing method; and (3) an adhesive sealing method, among which the water sealing method (2) is useful and generally used.

EXAMPLES

The present disclosure will hereinafter be described more specifically by way of examples thereof. However, it should be understood that the present disclosure be not limited to these examples within the scope of the disclosure.

In the examples, "part(s)" and "%" are based on weight. The following PVA resins were prepared:

Carboxyl-modified PVA (A1) having a 4% aqueous solution viscosity of 22 mPa·s as measured at 20° C., an average saponification degree of 96 mol % and a monomethyl maleate modification degree of 4.0 mol %

Carboxyl-modified PVA (A2) having a 4% aqueous solution viscosity of 22 mPa·s as measured at 20° C., an average saponification degree of 94 mol % and a monomethyl maleate modification degree of 2.0 mol %

Unmodified PVA (A3) having a 4% aqueous solution viscosity of 18 mPa·s as measured at 20° C. and an average saponification degree of 88 mol %

The following plasticizers were prepared:
Sorbitol (b1)
Glycerin (b2)
Trimethylolpropane (b3)

Example 1

A PVA aqueous solution (having a solid concentration of 25%) was prepared by mixing 100 parts of the carboxyl-modified PVA (A1) as the PVA resin (A), 20 parts of the sorbitol (b1) and 20 parts of the glycerin (b2) as the plasticizer (B), 8 parts of starch (having an average particle diameter of 20 μm) as a filler (C), 2 parts of a polyoxyalkylene alkyl ether phosphate monoethanolamine salt as a surfactant (D) and water for dispersing the starch and dissolving the other ingredients in water.

The resulting PVA aqueous solution was degassed at 80° C., and then cooled to 40° C. The PVA aqueous solution was flow-cast on a polyethylene terephthalate film, which was in turn passed through a 3-m long drying chamber (at 105° C.) at a speed of 0.350 m/minute to be thereby dried. Thus, a PVA film (water-soluble film) having a thickness of 94 μm was formed.

The PVA film thus formed was evaluated for the following evaluation items. The results of the evaluation are shown in Table 1.

[Tensile Strength and Tensile Elongation]

Measurement was performed on the resulting PVA film in conformity with JIS K7127 (1999). Before the measurement, the PVA film was allowed to stand in an environment conditioned at 23° C. at a humidity of 50% RH for 24 hours. In this environment, the measurement was performed on the PVA film at a stretching rate of 200 mm/minute (with a film width of 15 mm and an inter-chuck distance of 50 mm) by means of AUTOGRAPH AGS-H available from Shimadzu Corporation (with analysis software Factory SHiKiBU2000 available from Shimadzu Corporation).

[Evaluation of Chemical Agent Package for PVA Film Tension]

A chemical agent package was produced from the resulting PVA film in the following manner by means of a package producing apparatus available from Engel Corporation.

More specifically, a bottom film of the PVA film was fixed onto a mold (for a package having a length of 45 mm, a width of 42 mm and a height of 30 mm) disposed in a lower portion of the apparatus, and a top film of the PVA film was fixed to an upper portion of the apparatus. The bottom film was heated for 10 minutes by a drier capable of blowing hot air at 90° C., and vacuum-formed in the mold. Thereafter, 20 mL of Proctor and Gamble's liquid detergent ARIEL POWER GEL BALL (containing 5.4% of glycerin, 22.6% of propylene glycol and 10.4% of water) was put on the formed bottom film of the PVA film. Then, 1.5 g of water was applied to the top film, which was in turn pressed against the bottom film. The top film and the bottom film were press-sealed for 30 seconds, and then released from vacuum. Thus, a chemical agent package was produced. Thereafter, the chemical agent package was moisture-conditioned at 23° C. at 40% RH for 2 hours. The height (X1 (mm)) of the chemical agent package was 30 mm as measured when the chemical agent package was placed in a naturally self-standing attitude.

Subsequently, the chemical agent package was allowed to stand at 40° C. at 65% RH for 1 week after the production thereof, and then at 23° C. at 50% RH for 1 hour. Thereafter, the height (X2 (mm)) of the chemical agent package was measured when the chemical agent package was placed in a naturally self-standing attitude. The chemical agent package was evaluated for the tension of the PVA film based on a value (X3 (mm)) calculated from the following expression. A smaller value X3 means that the PVA film has higher tension.

Examples 2 to 7 and Comparative Examples 1 to 4

PVA films (water-soluble films) were produced in substantially the same manner as in Example 1, except that specifications were changed as shown in Tables 1 and 2.

The resulting PVA films (water-soluble films) were evaluated in the same manner as in Example 1.

The results of the evaluation for Examples and Comparative Examples are shown below in Tables 1 and 2.

TABLE 1

|  | Example 1 | Example 2 | Example 3 | Example 4 | Example 5 | Example 6 | Example 7 |
|---|---|---|---|---|---|---|---|
| PVA film (water-soluble film) PVA resin (A) (parts by weight) | | | | | | | |
| Carboxyl-modified PVA (A1) | 100 | — | — | — | — | — | — |
| Carboxyl-modified PVA (A2) | — | 90 | 90 | 90 | 90 | — | — |
| Unmodified PVA (A3) | — | 10 | 10 | 10 | 10 | — | — |
| Unmodified PVA (A4) | — | — | — | — | — | 65 | 65 |
| Unmodified PVA (A5) | — | — | — | — | — | 35 | 35 |
| Plasticizer (B) (parts by weight) | | | | | | | |
| Sorbitol (b1) | 20 | 20 | 17 | 13 | 15 | 10 | 10 |
| Glycerin (b2) | 20 | 20 | 18 | 21 | 18 | 20 | 30 |
| Trimethylolpropane (b3) | — | — | — | — | — | — | — |
| Weight ratio (b1/b2) for plasticizer (B) | 1.0 | 1.0 | 0.9 | 0.6 | 0.8 | 0.5 | 0.3 |
| Thickness (μm) | 94 | 89 | 86 | 92 | 85 | 87 | 91 |
| Physical properties of film | | | | | | | |
| Tensile strength (MPa) | 20 | 20 | 22 | 19 | 22 | 20 | 16 |
| Tensile elongation (%) | 500 | 460 | 400 | 480 | 420 | 400 | 460 |
| PVA film of chemical agent package | | | | | | | |
| Package height X1 (mm) | 30 | 30 | 31 | 31 | 31 | 31 | 31 |
| Package height X2 (mm) | 24 | 27 | 26 | 26 | 25 | 26 | 29 |
| Tension evaluation X3 (mm) | 6 | 3 | 5 | 5 | 6 | 5 | 2 |

TABLE 2

|  | Comparative Example 1 | Comparative Example 2 | Comparative Example 3 | Comparative Example 4 |
|---|---|---|---|---|
| PVA film (water-soluble film) PVA resin (A) | | | | |
| Carboxyl-modified PVA (A1) | 100 | — | — | — |
| Carboxyl-modified PVA (A2) | — | 90 | 90 | — |
| Unmodified PVA (A1) | — | — | — | 65 |
| Unmodified PVA (A2) | — | — | — | 35 |
| Unmodified PVA (A3) | — | 10 | 10 | — |
| Plasticizer (B) | | | | |
| Sorbitol (b1) | — | 10 | 40 | — |
| Glycerin (b2) | 16 | 10 | — | 30 |
| Trimethylolpropane (b3) | 10 | — | — | — |
| Weight ratio (b1/b2) for plasticizer (B) | — | 1.0 | — | — |
| Thickness (μm) | 86 | 74 | 89 | 91 |
| Physical properties of film | | | | |
| Tensile strength (MPa) | 19 | 27 | 23 | 14 |
| Tensile elongation (%) | 400 | 310 | 370 | 550 |
| PVA film of chemical agent package | | | | |
| Package height X1 (mm) | 30 | 30 | 30 | 31 |
| Package height X2 (mm) | 20 | 21 | 23 | 24 |
| Tension evaluation X3 (mm) | 10 | 9 | 7 | 7 |

The PVA films of Examples 4 to 7 and Comparative Example 4 were evaluated for the following evaluation items:

[Antiblocking Property]

The PVA films were each cut into a 150-mm square PVA film piece, and 50 such PVA film pieces were stacked. Then, a 150-mm square 2-kg weight was placed on the resulting stack, which was in turn allowed to stand at 23° C. at 40% RH for 1 week. The PVA film pieces were visually checked immediately after being taken out, and evaluated based on the following criteria:

Acceptable (○): The blocking was not observed, and the PVA film pieces were separated from each other when being lifted.

Unacceptable (x): The blocking was observed, and the PVA film pieces were not separated from each other when being simply lifted.

[Antibleeding Property]

The PVA films were each cut into a 1-m square PVA film piece, which was in turn allowed to stand at 23° C. at 50% RH for 1 week. Then, the PVA film piece was visually checked when being taken out, and evaluated based on the following criteria:

Acceptable (○): The bleeding was not observed.

Unacceptable (x): The bleeding of a solid or liquid substance was observed.

The results of the evaluation for Examples 4 to 7 and Comparative Example 4 are shown below in Table 3.

TABLE 3

|  | Example 4 | Example 5 | Example 6 | Example 7 | Comparative Example 4 |
|---|---|---|---|---|---|
| PVA film (water-soluble film) PVA resin (A) | | | | | |
| Carboxyl-modified PVA (A2) | 90 | 90 | — | — | — |
| Unmodified PVA (A1) | — | — | — | — | 65 |
| Unmodified PVA (A2) | — | — | — | — | 35 |
| Unmodified PVA (A3) | 10 | 10 | — | — | — |
| Unmodified PVA (A4) | — | — | 65 | 65 | — |
| Unmodified PVA (A5) | — | — | 35 | 35 | — |

TABLE 3-continued

|  | Example 4 | Example 5 | Example 6 | Example 7 | Comparative Example 4 |
|---|---|---|---|---|---|
| Plasticizer (B) | | | | | |
| Sorbitol (b1) | 13 | 15 | 10 | 10 | — |
| Glycerin (b2) | 21 | 18 | 20 | 30 | 30 |
| Weight ratio (b1/b2) for plasticizer (B) | 0.6 | 0.8 | 0.5 | 0.3 | — |
| Physical properties of film | | | | | |
| Antiblocking property | ○ | ○ | ○ | ○ | x |
| Antibleeding property | ○ | ○ | ○ | ○ | ○ |

The results shown in Tables 1 and 2 indicate that the water-soluble films of Examples each containing a plasticizer of the predetermined formulation had excellent mechanical properties (higher tensile strength and higher tensile elongation), and did not lose the tension over time even when being used for the package in which liquid such as the liquid detergent was packaged. On the other hand, the water-soluble film of Comparative Example 1, which did not contain sorbitol as the plasticizer, lost the tension, and had a smaller tensile elongation. The water-soluble film of Comparative Example 2, which contained the plasticizer in an excessively small proportion, had a smaller tensile elongation, and lost the tension to be significantly slack. The water-soluble film of Comparative Example 3, which employed sorbitol alone as the plasticizer, had a slightly lower tension and a smaller tensile elongation, and suffered from the bleeding. Therefore, all the water-soluble films of Comparative Examples failed to achieve the object of the present disclosure.

The results shown in Table 3 indicate that the water-soluble films of Examples 4 to 7, which contained the polyalcohol (b1) having a melting point of at least 80° C. and the polyalcohol (b2) having a melting point of at most 50° C. in a weight ratio (b1/b2) of 0.1 to 0.9 as the plasticizer, were excellent in antiblocking property and antibleeding property.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive water-soluble film has satisfactory water solubility and excellent mechanical properties (higher tensile strength and higher tensile elongation), and can be formed into an excellent package which is free from deterioration of the tension of the water-soluble film over time even if containing liquid such as a liquid detergent packaged therein. The water-soluble film is usable for a variety of packaging applications, and particularly useful for a unit packaging application for packaging a chemical agent or the like.

The invention claimed is:

1. A water-soluble film comprising:
   (A) a polyvinyl alcohol resin; and
   (B) a plasticizer;
   wherein the plasticizer (B) includes a polyalcohol (b 1) having a melting point of at least 80° C. and a polyalcohol (b2) having a melting point of at most 50° C.; and
   wherein the plasticizer (B) is present in a proportion of at least 25 parts by weight based on 100 parts by weight of the polyvinyl alcohol resin (A).

2. The water-soluble film according to claim 1, wherein the polyalcohol (b1) having a melting point of at least 80° C. and the polyalcohol (b2) having a melting point of at most 50° C. for the plasticizer (B) are present in a weight ratio (b1/b2) of 0.1 to 5.

3. The water-soluble film according to claim 1, wherein the polyalcohol (b1) having a melting point of at least 80° C. and the polyalcohol (b2) having a melting point of at most 50° C. for the plasticizer (B) are present in a weight ratio (b1/b2) of 0.1 to 0.9.

4. The water-soluble film according to claim 1, wherein the polyalcohol (b1) having a melting point of at least 80° C. has at least four hydroxyl groups per molecule.

5. The water-soluble film according to claim 1, wherein the polyalcohol (b 1) having a melting point of at least 80° C. has a molecular weight of at least 150.

6. The water-soluble film according to claim 1, wherein the polyalcohol (b2) having a melting point of at most 50° C. has at most four hydroxyl groups per molecule.

7. The water-soluble film according to claim 1, wherein the polyalcohol (b2) having a melting point of at most 50° C. has a molecular weight of at most 100.

8. The water-soluble film according to claim 1, wherein the polyvinyl alcohol resin (A) includes an anionic group-modified polyvinyl alcohol resin.

9. The water-soluble film according to claim 1, wherein the polyvinyl alcohol resin (A) includes an anionic group-modified polyvinyl alcohol resin and an unmodified polyvinyl alcohol.

10. The water-soluble film according to claim 1, wherein the water-soluble film has a water content of 3 to 15 wt. %.

11. The water-soluble film according to claim 1, wherein the water-soluble film is usable for a chemical agent package.

12. A chemical agent package comprising:
    a package bag formed from the water-soluble film according to claim 1; and
    a liquid detergent packaged in the package bag.

13. The chemical agent package according to claim 12, wherein the liquid detergent has a pH of 6 to 12 when being dissolved or dispersed in water, and
    wherein the liquid detergent has a water content of at most 15 wt. %.

* * * * *